INVENTOR.
LLEWELLYN T. BARNES
BY Amster & Levy
ATTORNEYS

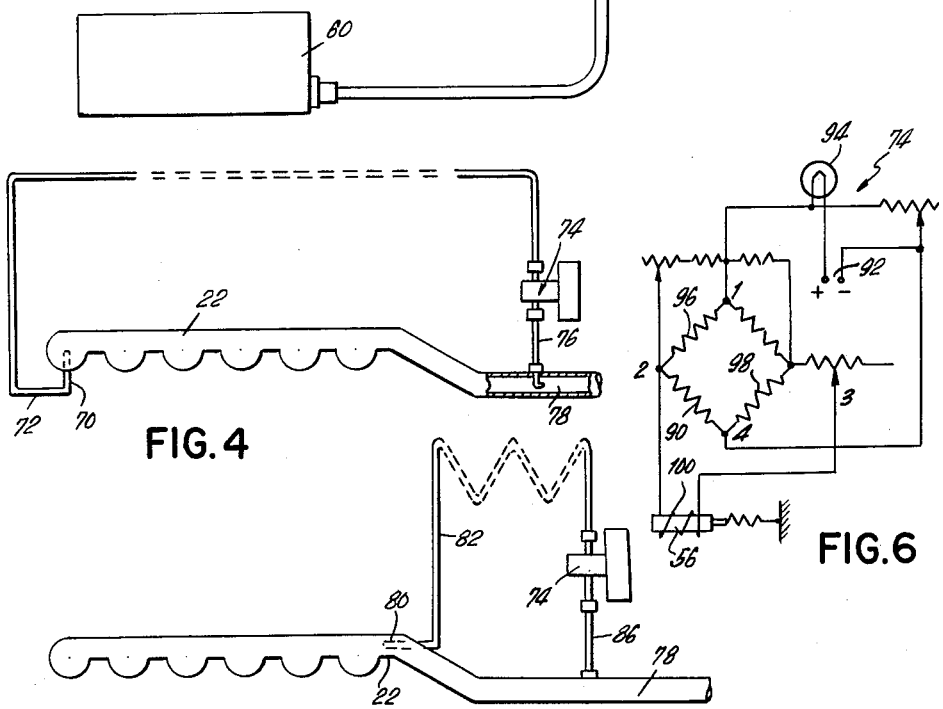

May 8, 1962  L. T. BARNES  3,032,969
VENTURI DEGASSING ATTACHMENT
Filed Aug. 28, 1961  3 Sheets-Sheet 3

INVENTOR.
LLEWELLYN T. BARNES
BY Amster & Levy
ATTORNEYS

United States Patent Office 3,032,969
Patented May 8, 1962

3,032,969
VENTURI DEGASSING ATTACHMENT
Llewellyn T. Barnes, 155 Atlantic Ave., Freeport, N.Y.
Filed Aug. 28, 1961, Ser. No. 134,414
8 Claims. (Cl. 60—30)

This invention relates to means for eliminating obnoxious fumes from the exhaust gases of internal combustion engines and more particularly to a novel Venturi degassing attachment especially adapted for use in automotive vehicles.

Internal combustion engines as are conventionally used in automotive vehicles are provided with carburetors which deliver to the engine cylinders mixtures of fuel and air in a ratio determined by engine load, engine speed, or both. Idle or slow speed operation of the engine requires a lower ratio of fuel-to-air than full throttle operation under load conditions. Even with correct carburetor settings the engine operation is subject to inertia in fuel flow which produces an incorrect fuel-air mixture. The velocity of air drawn through the carburetor varies as the velocity of the engine speed and the velocity of the fuel fed should vary in the same manner in order to maintain consistency of the mixture. However, because of the greater weight of the liquid fuel as compared to air, the fuel displays greater inertia resisting a change of velocity, so that under continually changing running conditions, there is constantly either an excess or deficiency of fuel in the mixture, causing incomplete combustion and release of obnoxious or poisonous gases or fumes.

Improper or incomplete combustion is also caused by the inherent differences in individual engine cylinders and their effective operations. Despite these differences, conventional carburetor systems are restricted to feeding the same fuel mixture to all of the cylinders through a common manifold. This results in incomplete combustion in some of the cylinders with resultant emission of obnoxious fumes.

Improper engine combustion produces poisonous carbon monoxide gas as well as obnoxious impure nitrogen gas. In addition, lubricating oil sucked up into the combustion chamber during high-vacuum overrunning conditions with the carburetor closed and the piston rapidly reciprocating liberates sulphur dioxide upon contact with hot surfaces, which, when moisturized, escapes as vaporized sulphurous acid. These factors result in the emission of an obnoxious exhaust dangerous to health and there have been many attempts made to control the composition of this exhaust. Therefore, an object of this invention is to provide means for completing the combustion of the fuel after it has passed out of the exhaust port of the cylinder together with providing means for rendering various impurities non-obnoxious.

In accordance with the invention, a Venturi degassing attachment is connected to the internal combustion engine at the exhaust ports of the respective cylinders thereof. In an illustrative embodiment of the invention there is provided a plurality of Venturis which are disposed in conduits connected to the exhaust outlets. The Venturis have apertures in restricted portions thereof communicating the interiors of the Venturis with the annular spaces defined between the conduits and the restricted portion of the Venturis. Pipes are connected to the conduits for introducing fluids into these annular spaces. A plurality of tubes are connected adjacent to the conduit for sampling exhaust gases that pass from the Venturis. Solenoid valves are provided in the pipes for controlling flow of oxygen and water from the pipes into the annular spaces between the Venturis and the conduits. One of the important features of the invention resides in the electrical control means operatively connecting an exhaust gas analyser to the solenoid valves for controlling the position of the solenoid valves in accordance with the chemical composition of the exhaust gas. In order to connect the exhaust gas analyser to the exhaust supports, there are provided valve means for selectively connecting the tubes to the exhaust gas analyser. The electrical control means includes a control arrangement connected to the valve means for controlling the particular solenoid valve associated with the respective cylinder, the exhaust gas of which is being tested.

An attempt has been made to overcome the production of obnoxious gases by rendering the fuel mixture comparatively lean. However, when the fuel mixture is lean enough so as to allow a clear exhaust to be obtained by an internal combustion engine, the combustion of the air-fuel mixture will be destructive to the valves, piston head, and walls of the interior of the engine ports that are exposed to this high air-fuel ratio. Thus, 100% combustion in the cylinder is not satisfactory to the life of the internal combustion engine. Accordingly, it is a further object of the present invention to provide means for adding corrective agents to exhaust gases passing from the individual exhaust ports of each engine cylinder of an internal combustion engine for treatment in proportion to the requirements of that particular cylinder so that the exhaust gases receive only the amount of treatment that is necessary to render the exhaust gases non-obnoxious.

A yet further object of the invention is to provide a degassing arrangement for use in combination with an internal combustion engine which includes means for testing the contents of the exhaust gases passing from their respective cylinders and then providing a signal to solenoid valves controlling flow of fluids into a Venturi associated with each of the outlet ports of each cylinder so that fluids such as oxygen steam or water can be added for neutralizing or oxidizing the exhaust gases passing out of the outlet port of a respective cylinder.

These, together with the various ancillary objects and features of the present invention which will become apparent as the following description proceeds, are attained by this degassing arrangement, preferred embodiments of which have been illustrated in the accompanying drawings, by way of example only, wherein:

FIG. 3 is a schematic diagram of the degassig attachment particularly illustrating the means for feeding fluid into the Venturi for treating the exhaust gas;

FIG. 4 is a schematic diagram illustrating one arrangement of parts wherein an exhaust gas analyzer is used for testing the gases from one of the cylinders of an internal combustion engine;

FIG. 5 is a schematic diagram of an arrangement of parts wherein the combined exhaust gases in the exhaust manifold are tested by passage through an exhaust gas analyzer.

FIG. 6 is schematic wiring diagram of the electrical components of the invention used in controlling a solenoid valve which in turn controls the flow of fluid into the Venturi attachment; and, FIG. 7 is a schematic wiring diagram of another embodiment of the invention wherein each of the engine cylinders may be successively tested and the solenoid valve thereof can be adjusted.

Figure 1:
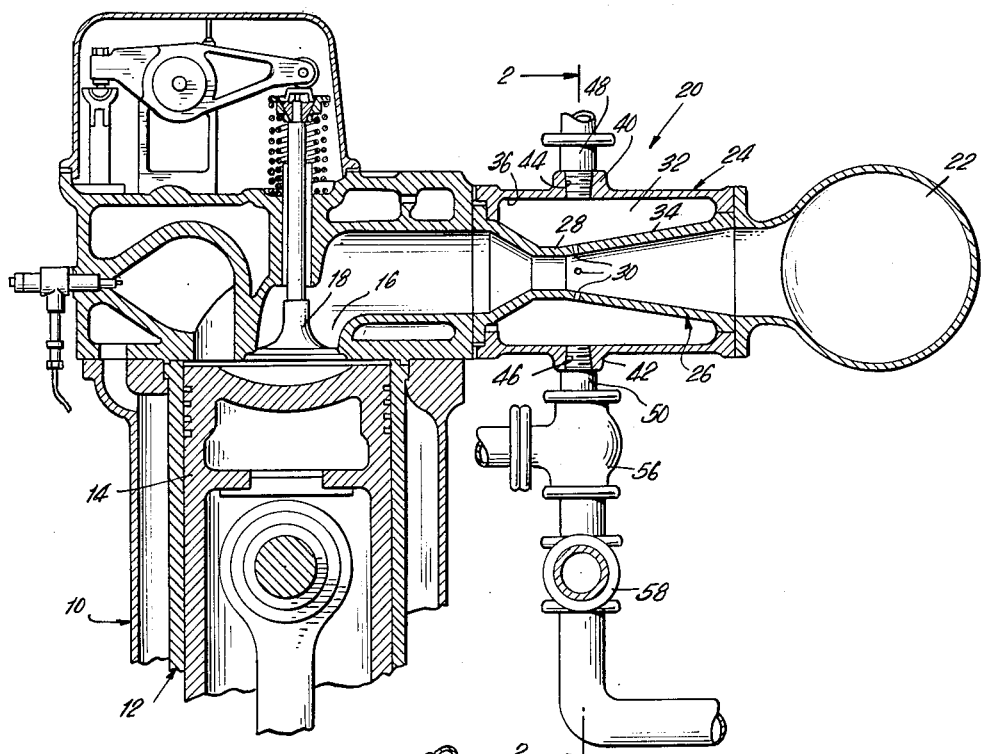
FIG. 1 is a sectional detail view through a portion of a cylinder of an internal combustion engine illustrating the degassing attachment at the outlet port of a cylinder.
Figure 2:
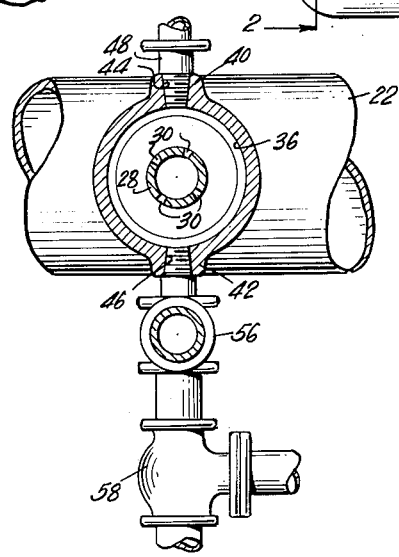
FIG. 2 is a sectional detail view taken along the plane of line 2—2 of FIG. 1.

With continuing reference to the accompanying drawings wherein like reference numerals designate similar parts throughout the various views, reference numeral 10 generally designates an internal combustion engine having a cylinder 12 in which a piston 14 reciprocates and the exhaust gases of combustion pass through an exhaust port 16 controlled by an exhaust valve 18.

The degassing attachment comprising the present invention generally designated by reference numeral 20 is arranged to be attached by oval flange connection to the exhaust port 16 and is disposed between the exhaust port 16 and the exhaust manifold 22. The attachment 20 is designed to be connected between each of the cylinders 12 and the exhaust manifold 22 and depending upon the number of cylinders that are provided the attachment 22 will include a plurality of casings 24 forming conduits interconnecting the exhaust port 16 with the exhaust manifold 22. The casing 24 has a Venturi 26 mounted therein which has a restricted portion 28. At the restricted portion 28 there are provided a plurality of apertures 30 in the Venturi 26 so as to suck fluid into the Venturi 26 from the annular space 32 between the outer wall 34 of the Venturi and the inner wall 36 of the casing 24. The Venturi provides the passageway for the exhaust gases and the fluid in the space 32 will become intermingled with the exhaust gases as they pass through the Venturi 26 and into the exhaust manifold 22. In order to assure reduction of the obnoxious material in the exhaust gas passing through the Venturi 26, suitable fluids are introduced into the space 32. To achieve this end, the casing 24 has a plurality of reinforced portions as at 40 and 42 which are internally threaded at 44, 46 respectively for the threaded reception of pipes 48 and 50 for delivering fluids into the space 32. These fluids can be oxygen, water, steam or other suitable fluids for achieving the purpose of eliminating the obnoxious contents of the exhaust gases. In the conduit 48 as well as in the conduit 50 there are provided valve means for controlling the flow of fluids into the space 32. These valve means may include a solenoid valve 56 and a check valve 58. As can be seen in FIG. 3, each of the casings 24, 24a, 24b, 24c, 24d, 24e has a series of valves 56, 56a through 56e and 58, 58a through 58e for controlling flow of a fluid such as oxygen from a tank 60 into the space 32, 32a through 32e. Likewise, the flow of water from the tank 62 to the space 32, 32b through 32e is controlled by check valves 62, 62a through 62e and solenoid valves 64, 64a through 64e.

Referring now to FIG. 4 there is shown schematically an embodiment of the electrical contact means which is operatively connected to the solenoid valve 58 for controlling the position of the solenoid valve, in accordance with the chemical composition of the exhaust gas. Connected to the exhaust gas passageway as it passes beyond the Venturi 26 and prior to entering the exhaust gas manifold is a set of Inconel sample points 70 forming the end of inlet tube 72 which is connected to feed the gases to an analysis cell 74. The gases, after they pass through the analysis cell 74, pass through tubing 76 and then pass through the exhaust pipe 78. The analysis cell 74 may be of the type manufactured by Cambridge Instrument Co. Depending upon the chemical composition of the exhaust gases, the analysis cell 74 will provide a signal to the respective solenoid valve 56 for controlling the setting of the solenoid valve 36. The solenoid valve may be of the type wherein once it has been set remains at that setting until a further signal is applied on the solenoid valve 56. A modified arrangement is shown in FIG. 5 wherein the Inconel sampling points 80 are connected to the exhaust manifold 22 so that the mixture of the gases from all of the cylinders is passed through the tubing 82 to the analysis cell 74 and thence pass through tubing 86 into the exhaust pipe 78.

In FIG. 6 there is shown schematically the arrangement of the analysis cell 74 for providing an electrical signal to the solenoid valve 56. The analysis cell may include a Wheatstone bridge 90. The Wheatstone bridge is fed by a 12 volt D.C. current supply 92 through a ballast tube 94. The legs 96 and 98 of the Wheatstone bridge 90 are arranged so that they will have a resistance proportionate to the chemical contents of the exhaust gas being analysed. Hence, the signal on the coil 100 of the solenoid 56 will be predetermined by the chemical composition of the exhaust gas and the solenoid valve 56 will be set to open to provide a significant flow of fluid into the chamber 32 dependent upon the condition of the exhaust gas. Of course, no signal at all can be provided on the coil 100 whereby this solenoid valve will close completely.

Referring now to the schematic diagram as shown in FIG. 6, there is shown an arrangement wherein a single analysis cell 74 can be utilized for controlling all the solenoid valves 56, 56a, 56b, 56c, 56d, 56e, 56f of a degassing arrangement for a six cylinder internal combustion engine wherein there is provided a solenoid valve for controlling the flow of fluid into the spaces 32, 32a through 32e. The solenoid valve 56a controls flow of fluid into a like space of a casing having a Venturi therein which is connected to the exhaust manifold, not shown. In order to selectively connect the analyser 74 so that the analysis cell 90 will receive gas from either the exhaust gas manifold or from a location adjacent the outlet port 16 of each of the several cylinders after it has passed through the Venturi 26 attached at the respective outlet port of each cylinder, there is provided a manually controlled valve 110. The valve 110 is an eight way valve having an "Off" position 112 and other positions 114, 116, 118, 120, 122, 124 and 126 for connecting to the respective sampling tubes which in turn are connected just behind the respective Venturis at the outlet ports of each of the cylinders. When the valve 110 is in the position 112 as is illustrated, the valve is in an "Off" position. There is provided a switch 150 corresponding to the valve 110 and mechanically linked thereto by a suitable linkage 152. The switch has a series of eight positions with sets of contacts provided for each as indicated at 154, 156, 158, 160, 162, 164, 166 and 168.

In operation, the valve 110 is shifted successively to provide a signal to the respective solenoid valve 56, 56a etc. For example, with the valve in position 118, the contacts 160 are closed so that after the gas has passed into the analysis cell 90, a signal will be applied on the solenoid valve 56c for controlling flow of fluid from the corresponding space 32b within the casing 24b. Thus, the nauseous or obnoxious gases passing out of the exhaust port 16 of each cylinder may be treated. Further, the exhaust gases in the exhaust gas manifold may also be treated and thus rendered neutral.

Figure 7:
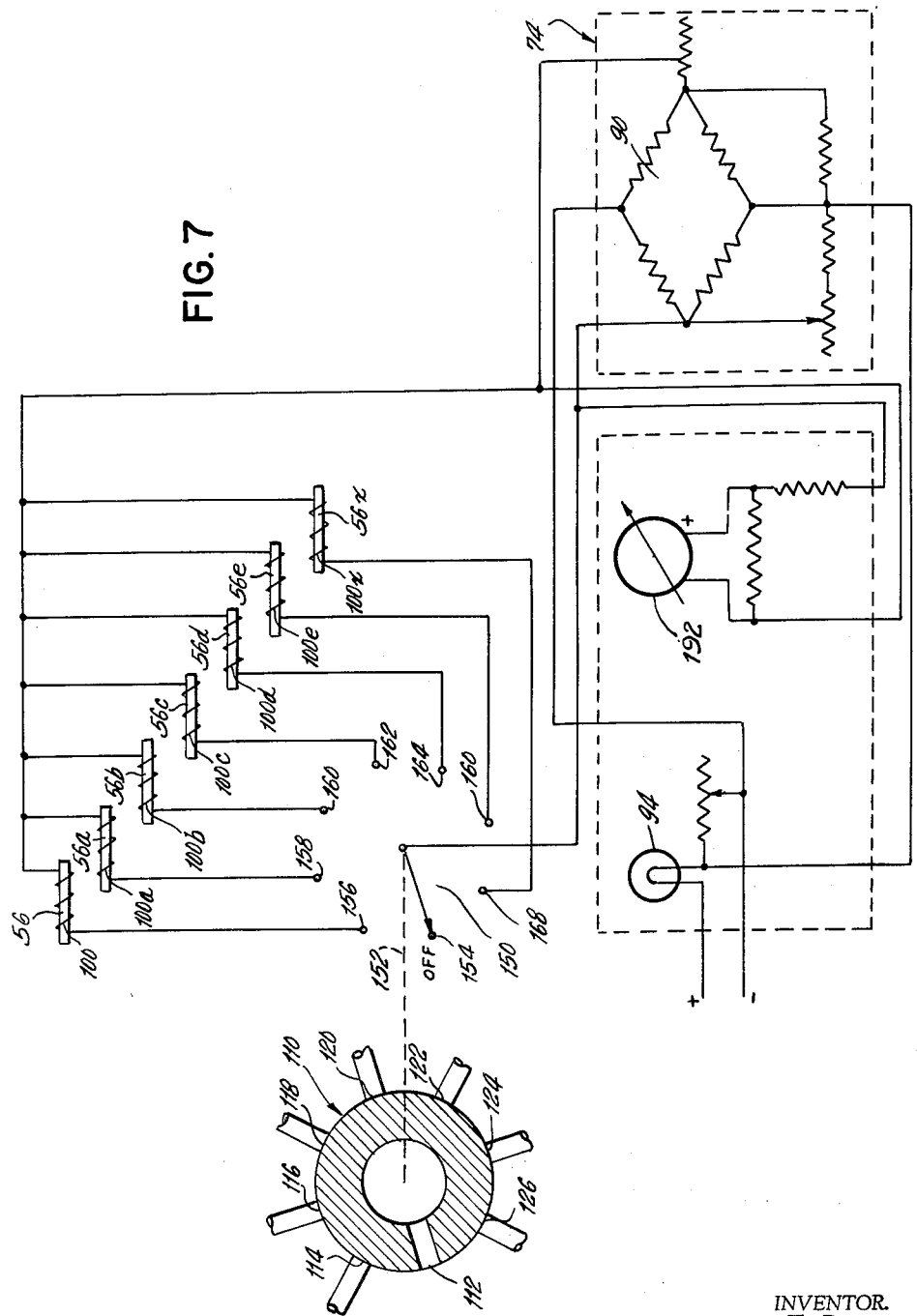

Indicator 192 may be mounted in the cab and connected as is illustrated in FIG. 7 so as to provide a visual indication of the electric signal which is being applied on the solenoid valve of the respective cylinder.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

What I claim is:

1. A Venturi degassing attachment for connection between the exhaust port of an internal combustion engine cylinder and an exhaust manifold comprising a casing, a Venturi disposed in said casing, said Venturi having a restricted portion provided with at least one aperture therethrough communicating said Venturi with the annular space between said Venturi and said casing, a conduit for feeding fluid into said space connected to said casing, a solenoid valve controlling fluid flow in said conduit, and means responsive to the chemical composition of exhaust gases passing through said Venturi for controlling said solenoid valve.

2. A Venturi degassing arrangement for connection between the exhaust ports of internal combustion engine cylinders and an exhaust manifold comprising a plurality of casings, Venturis disposed in said casings, said Venturis having restricted portions provided with apertures therethrough communicating said Venturis with the annular spaces between said Venturis and said casings, conduits for feeding fluid into said spaces connected to said casings, solenoid valves controlling fluid flow in said conduits, and means connected to said exhaust manifold responsive to the chemical composition of exhaust gases passing through said Venturis for controlling said solenoid valves.

3. A Venturi degassing arrangement for connection between the exhaust ports of internal combustion engine cylinders and an exhaust manifold comprising a plurality of casings, Venturis disposed in said casings, said Venturis having restricted portions provided with apertures therethrough communicating said Venturis with the annular spaces between said Venturis and said casings, conduits for feeding fluid into said spaces connected to said casings, solenoid valves controlling fluid flow in said conduits, and means connected to said exhaust manifold responsive to the chemical composition of exhaust gases passing through said Venturis for controlling said solenoid valves, said means including electrical switch means for individually controlling the respective solenoid valve of a particular cylinder.

4. A Venturi degassing attachment for connection between the exhaust port of an internal combustion engine cylinder and an exhaust manifold comprising a casing, a Venturi disposed in said casing, said Venturi having a restricted portion provided with at least one aperture therethrough communicating said Venturi with the annular space between said Venturi and said casing, conduits for feeding oxygen and water into said space connected to said casing, solenoid valves controlling flow of oxygen and water in said conduits, and means responsive to the chemical composition of exhaust gases passing through said Venturi for controlling said solenoid valves, said means including an exhaust gas analyser for testing the exhaust gases, and electrical control means connected to said analyser for controlling said solenoid valves.

5. A degassing arrangement for an internal combustion engine having a plurality of cylinders provided with exhaust gas outlets and having an exhaust manifold connected to said exhaust outlets comprising conduits connected to said exhaust outlets between said cylinders and said exhaust manifold, Venturis disposed in said conduits, said Venturis having apertures in restricted portions thereof communicating the interiors of said Venturis wtih the annular spaces defined between said conduits and said restricted portions of said Venturis, pipes connected to said conduits for introducing fluids into said annular spaces, exhaust gas analysing means connected adjacent said conduits for testing exhaust gas as it passes from said Venturis, solenoid valves controlling fluid flow from said pipes into said annular spaces, and electrical control means operatively electrically connecting said exhaust gas analyzing means to said solenoid valves for controlling the position of said solenoid valves in accordance with the condition of the exhaust gases.

6. A degassing arrangement for an internal combustion engine having a cylinder provided with an exhaust gas outlet and having an exhaust manifold connected to said exhaust outlet comprising a conduit connected to said exhaust outlet between said cylinder and said exhaust manifold, a Venturi disposed in said conduit, said Venturi having apertures in a restricted portion thereof communicating the interior of said Venturi with the annular space defined between said conduit and said restricted portion of said Venturi, pipes connected to said conduit for introducing oxygen and water into said annular space, exhaust gas analyzing means connected adjacent said conduit for testing exhaust gas as it passes from said Venturi, solenoid valves controlling fluid flow from said pipes into said annular space, and electrical control means operatively electrically connecting said exhaust gas analyzing means to said solenoid valves for controlling the position of flow of oxygen and water into said annular space in accordance with the chemical composition of the exhaust gases.

7. A degassing arrangement for an internal combustion engine having a plurality of cylinders provided with exhaust gas outlets and having an exhaust manifold connected to said exhaust outlets comprising conduits connected to said exhaust outlets between said cylinders and said exhaust manifold, Venturis disposed in said conduits, said Venturis having apertures in restricted portions thereof communicating the interiors of said Venturis with the annular spaces defined between said conduits and said restricted portions of said Venturis, pipes connected to said conduits for introducing fluids into said annular spaces, a plurality of tubes connected adjacent said conduits for sampling exhaust gas as it passes from said Venturis, an exhaust gas analyser, valve means selectively connecting said tubes to said exhaust gas analyser, solenoid valves controlling flow of oxygen and water from said pipes into said annular spaces, and electrical control means operatively electrically connecting said exhaust gas analyser to said solenoid valves for controlling the position of said solenoid valves in accordance with chemical composition of the exhaust gases.

8. A degassing arrangement for an internal combustion engine having a plurality of cylinders provided with exhaust gas outlets and having an exhaust manifold connected to said exhaust outlets comprising conduits connected to said exhaust outlets between said cylinders and said exhaust manifold, Venturis disposed in said conduits, said Venturis having apertures in restricted portions thereof communicating the interiors of said Venturis with the annular spaces defined between said conduits and said restricted portions of said Venturis, pipes connected to said conduits for introducing fluids into said annular spaces, a plurality of tubes connected adjacent said conduits for sampling exhaust gas as it passes from said Venturis, an exhaust gas analyser, valve means selectively connecting said tubes to said exhaust gas analyser, solenoid valves controlling flow of oxygen and water from said pipes into said annular spaces, and electrical control means operatively electrically connecting said exhaust gas analyser to said solenoid valves for controlling the position of said solenoid valves in accordance with chemical composition of the exhaust gases, said electrical control means including switch means connected to said valve means for controlling the particular solenoid valve associated with the respective cylinder the exhaust gas of which is being tested.

No references cited.